United States Patent
Hirata et al.

(10) Patent No.: US 6,932,174 B2
(45) Date of Patent: Aug. 23, 2005

(54) CAPACITY INDICATING DEVICE AND METHOD THEREOF

(75) Inventors: Norihiko Hirata, Isehara (JP); Kenichi Sakai, Hadano (JP); Yuji Nakada, Fujisawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 141 days.

(21) Appl. No.: 10/270,570

(22) Filed: Oct. 16, 2002

(65) Prior Publication Data

US 2003/0094321 A1 May 22, 2003

(30) Foreign Application Priority Data

Nov. 21, 2001 (JP) ........................................ 2001-356283

(51) Int. Cl.[7] ................................................. B60K 1/00
(52) U.S. Cl. ........................ 180/65.2; 320/104; 320/162
(58) Field of Search ............................... 180/65.1, 65.2, 180/65.8; 320/104, 132, 162; 701/22, 29, 36

(56) References Cited

U.S. PATENT DOCUMENTS

| | | | | |
|---|---|---|---|---|
| 4,626,765 A | * | 12/1986 | Tanaka | 320/127 |
| 5,412,307 A | * | 5/1995 | Yoshimatsu | 320/136 |
| 5,612,608 A | * | 3/1997 | Ishiguro et al. | 340/636.12 |
| 5,699,050 A | | 12/1997 | Kanazawa | |
| 5,861,731 A | * | 1/1999 | Kim | 320/132 |
| 6,104,166 A | * | 8/2000 | Kikuchi et al. | 320/132 |
| 6,157,169 A | * | 12/2000 | Lee | 320/132 |
| 6,160,380 A | * | 12/2000 | Tsuji et al. | 320/132 |
| 6,275,008 B1 | * | 8/2001 | Arai et al. | 320/132 |
| 6,417,648 B2 | | 7/2002 | Suzuki et al. | |
| 6,424,157 B1 | * | 7/2002 | Gollomp et al. | 324/430 |

FOREIGN PATENT DOCUMENTS

JP          9-33623          2/1997

* cited by examiner

*Primary Examiner*—Christopher P. Ellis
*Assistant Examiner*—Brian Swenson
(74) *Attorney, Agent, or Firm*—Shinjyu Global IP Counselors, LLP

(57) ABSTRACT

A capacity indicating device is configured to indicate a fully charged state when full recharging has been conducted even if the battery is degraded; hold the possible traveling distance per segment roughly constant; and make it easy to estimate the possible cruising distance. The capacity indicating device has an indication control unit that: (1) allocates a prescribed portion of the battery capacity of a vehicle to a capacity adjustment region that serves to adjust the battery capacity as it decreases due to degradation of the battery; (2) calculates the degradation degree of the battery based on the detected voltage value and current value; (3) corrects the capacity adjustment region a based on the calculated degradation degree; and (4) indicates the present battery capacity using segments that are not affected by the degradation of the battery.

20 Claims, 7 Drawing Sheets

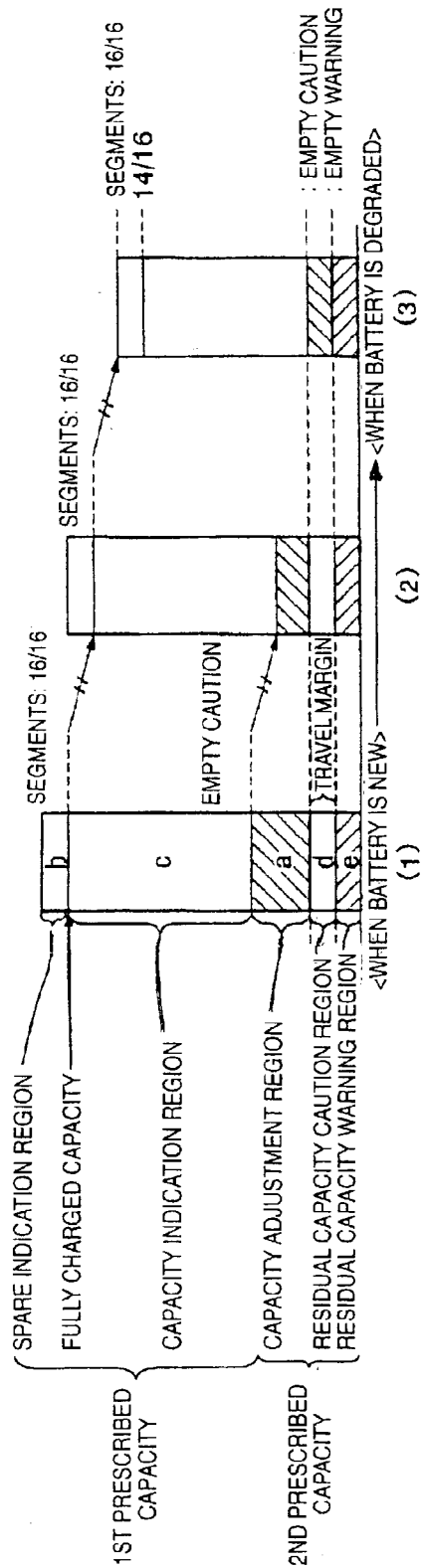
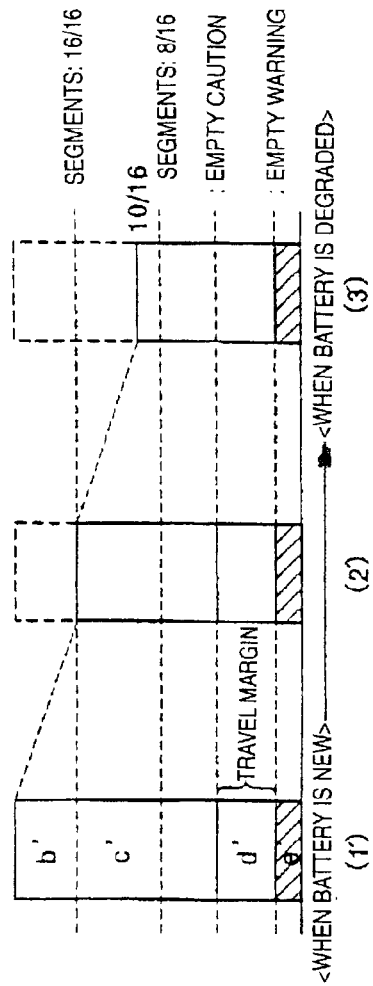
Fig. 3
Fig. 4

CAPACITY INDICATING DEVICE AND METHOD THEREOF

BACKGROUND OF THE INVENTION

1. Field of the Invention

The present invention relates to a capacity indicating device of a battery that indicates the energy capacity of a vehicle using a plurality of segments. More particularly, the present invention relates to a capacity indicating device of a battery that can accurately estimate the possible residual cruising distance even when the battery has degraded.

2. Background Information

Capacity indicating devices are known that indicate the residual capacity of a battery installed in an electric automobile or the like. An example of one known technology is disclosed in Japanese Laid-Open Patent Publication No. 9-33623 that indicates the absolute capacity of the battery using a plurality of segments. In this type of absolute capacity indicating device, the possible traveling distance per segment is fixed. Consequently, the user can easily estimate the possible cruising distance from the segment indication.

While the above-mentioned type of absolute capacity indicating device operates well, it will be apparent to those skilled in the art from this disclosure that there exists a need for an improved capacity indicating device. This invention addresses this need in the art as well as other needs, which will become apparent to those skilled in the art from this disclosure.

SUMMARY OF THE INVENTION

It has been discovered that the internal resistance of a battery increases as the battery degrades over time. When a battery has degraded, the quantity of electric charge achieved when the battery is fully charged will not be as large as when the battery was new. For example, if the battery of a vehicle having an indicating device provided with sixteen segments that can light up degrades, then a situation may occur where only ten of the sixteen segments light up even when the battery is fully charged. This creates a problem in that the user feels something is wrong with the capacity indication because the indicating device does not indicate a fully charged state even though full recharging was performed.

In response to this problem, a proposal has been made for a relative capacity indicator that allocates the full charge capacity at that point in time evenly to the prescribed segments regardless of whether the battery is new or degraded. In this kind of relative capacity indicator, the possible traveling time per segment is not constant and the effects of the previously described absolute capacity indicator cannot be obtained. Particularly in the case of electric automobiles and other cases where recharging equipment is not fully provided, these effects are advantageous from the standpoint of indicating the appropriate timing for recharging and because absolute capacity display makes it possible to estimate the cruising distance accurately.

The present invention was conceived in view of the aforementioned problems of the prior art. One object is to provide a capacity indicating device and capacity indicating method that do the following: reduce the effect that capacity changes accompanying degradation of the battery have on the capacity indication; indicate a fully charged state when a degraded battery has been fully charged while maintaining a constant possible traveling distance per segment; and prevent degradation of the battery over time from causing the user to experience a feeling that there is something wrong with the capacity indication.

In order to achieve the aforementioned object a capacity indicating device for a vehicle battery is provided with a first indicator, a second indicator and an indication control unit. The first indicator includes a display configured to selectively indicate a first prescribed energy capacity of a first portion of a vehicle battery capacity at full battery capacity and present battery capacity, which varies over time as power is consumed. The second indicator is configured to indicate when the vehicle battery capacity is discharged below a second prescribed energy capacity representing a second portion of the vehicle battery capacity. The indication control unit is configured to control activation of the first indicator based on the present battery capacity, control activation of the second indicator and correct the second prescribed capacity in response to the degree of degradation of the vehicle battery to maintain the first prescribed energy capacity after the degree of degradation of the vehicle battery.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is a diagram explaining an indication arrangement of a capacity indicating device according to one embodiment of the present invention;

FIG. 4 is a diagram explaining an indication arrangement of a conventional capacity indicating device;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
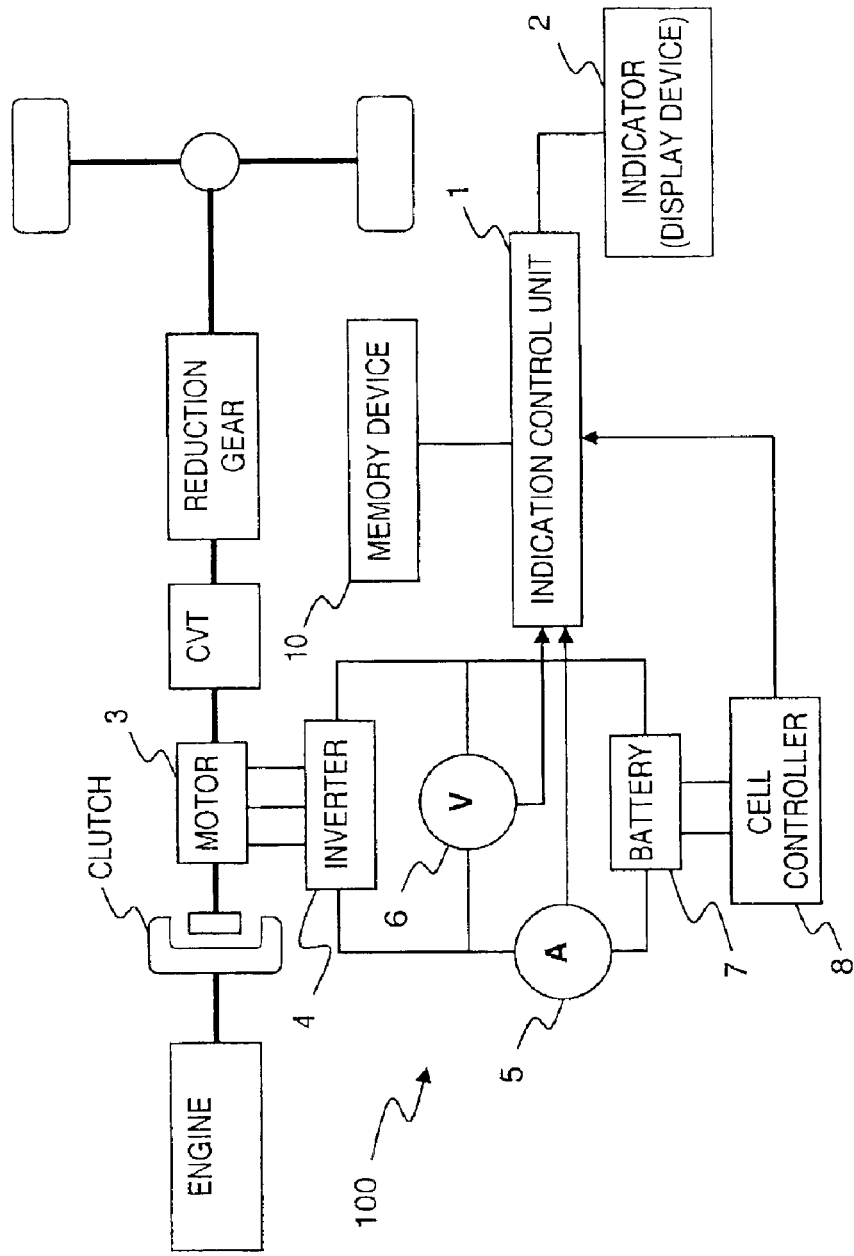
FIG. 1 is a simplified schematic view of a hybrid vehicle equipped with a battery capacity indicating device with an indication arrangement according to one embodiment of the present invention.
Figure 2:
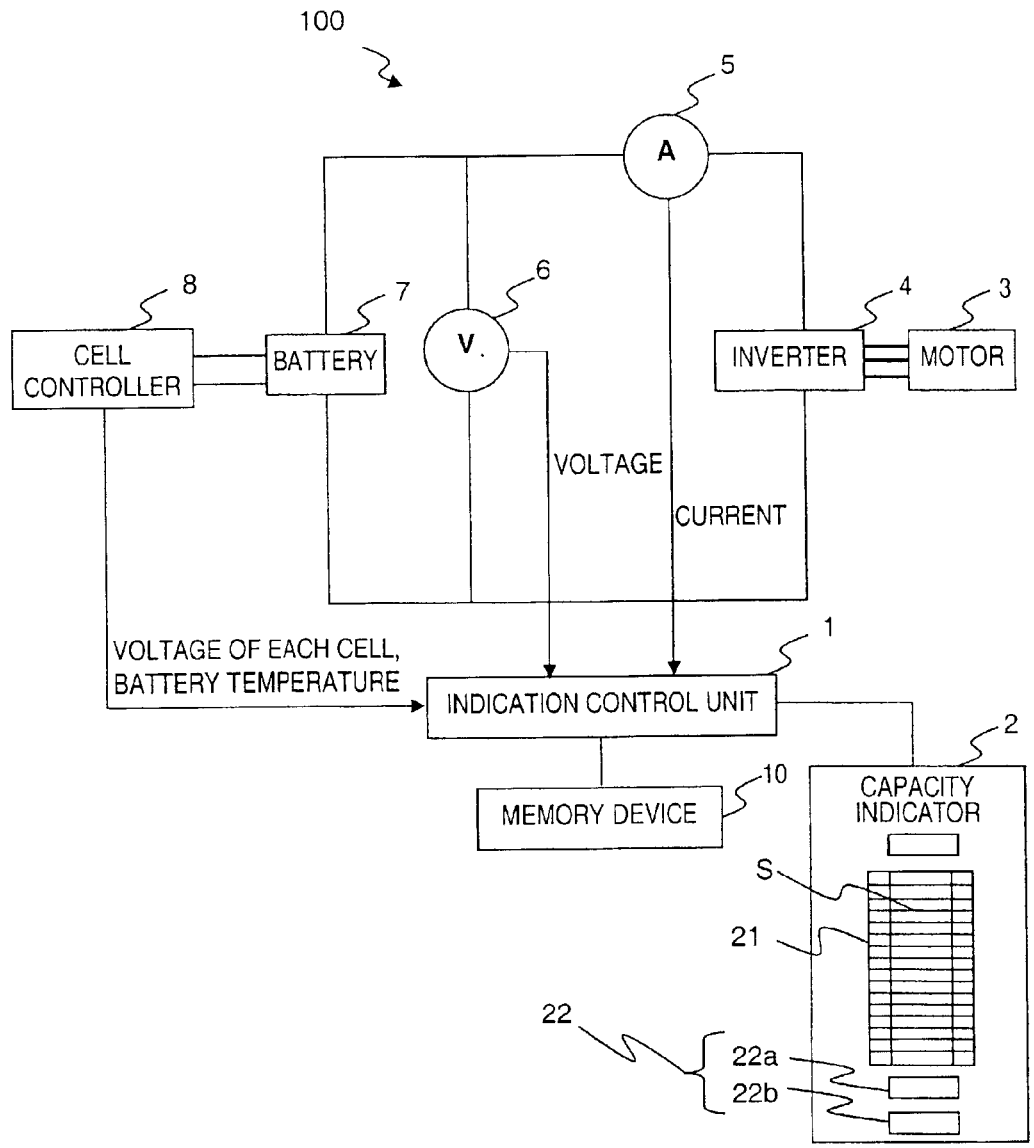
FIG. 2 is a schematic view of the capacity indicating device according to the present invention illustrated in FIG. 1.

Referring initially to FIG. 1, a simplified schematic view of a hybrid vehicle is illustrated that is equipped with a battery capacity indicating device 100 having an indication arrangement in accordance with a first embodiment of the present invention. Referring to FIG. 2, the capacity indicating device 100 is schematically illustrated by itself. The capacity indicating device 100 basically comprises an indication control unit (battery controller) 1, a capacity indicator (display) 2, a motor 3, an inverter 4, a current detecting device (current sensor) 5, a voltage detecting device (voltage sensor) 6, a multi-celled battery 7, a cell controller 8, and a memory or storage device 10. Although FIG. 1 illustrates use a hybrid vehicle as an example, it will be apparent to those skilled in the art from this disclosure that the capacity indicating device 100 of the present invention can be applied to either an electric automobile or a hybrid vehicle.

The capacity indicator or display 2 includes a first indicator 21 and a second indicator 22. The first indicator 21 indicates changes in the present battery capacity by using a plurality of selectively activated segments S, while the second indicator 22 includes a pair of Empty indicator lamps 22a and 22b to inform the user that the battery capacity is insufficient when the present battery capacity equals or falls below a second prescribed capacity. Of course, it will be apparent to those skilled in the art from this disclosure that other types of indicators, displays or signaling devices can be used to carry out the present invention.

The capacity indicating device 100 in accordance with the present invention is preferably installed in an electric automobile or a hybrid vehicle, and indicates the residual electric capacity of the battery 7. The capacity indicating device 100 of this embodiment indicates the battery capacity appropriately after full recharging even when the battery 7 is degraded. It also appropriately indicates the change in battery capacity that occurs as the vehicle travels while maintaining a constant possible traveling distance per segment indicator. Thus, this invention prevents the occurrence of capacity indications that seem wrong when the battery 7 degrades over time in an electric vehicle or a hybrid vehicle. While a constant possible traveling distance per segment is maintained, a fully charged state is indicated when a degraded battery has been fully charged. Thus, the capacity indicating device 100 prevents degradation of the battery 7 over time from causing the user to experience a feeling that there is something wrong with the capacity indication.

First, the indication arrangement of this embodiment will be generally explained and, afterwards, a specific method will be explained for incorporating the degradation degree of the battery 7 into the capacity indicator or display 2.

Overview of the Indication Arrangement

An overview of the indication arrangement of this embodiment is presented in FIG. 3, which shows an example the indication arrangement of the embodiment. FIG. 4 shows a conventional indication arrangement used as a comparison for explaining the illustrated embodiment. Thus, FIGS. 3 and 4 serve to explain how the battery capacity of a vehicle is allocated and the features of capacity indication.

In this embodiment, the battery capacity of the vehicle is sectioned into five capacity regions having prescribed values as explained below. In this embodiment, the capacity indications corresponding to these capacity regions are allocated to the first indicator 21 and the second indicator 22. In other words, in the capacity indicating device 100, a capacity indication corresponding to a first prescribed capacity representing a portion of the battery capacity is allocated to the first indicator 21 and a capacity indication corresponding to a second prescribed capacity representing a portion of the battery capacity is allocated to the second indicator 22. Of course, it will be apparent to those skilled in the art from this disclosure that the capacity indications can be allocated to other indicating devices as needed and/or desired. In any event, these sections or regions include at least a capacity region for the capacity corresponding to the first prescribed capacity and a capacity region for the capacity corresponding to the second prescribed capacity as explained below in more detail.

The second prescribed capacity is corrected in accordance with the degree of degradation of the vehicle battery and the second indicator 22 executes an indication based on the corrected second prescribed capacity. Meanwhile, the first prescribed capacity is not affected by the degradation of the battery. Instead, the first prescribed capacity varies over time as electric power is consumed and is displayed to the user as the residual capacity of the battery or the consumed capacity of the battery 7 with respect to the total capacity. Thus, in the capacity indicating method of the present invention, the battery capacity of a vehicle is divided into a plurality of sections including a capacity adjustment section that is corrected in response to the degree of degradation of the vehicle. The present battery capacity is indicated to the user using the sections other than the capacity adjustment section.

In the illustrated embodiment, the degree of degradation of the vehicle battery 7 refers to, for example, the degree to which degradation has progressed in comparison with a new battery or other reference battery and can be found based from either an experiential or an experimental perspective. For example, based on the idea that the battery degrades over time, the change in degree of degradation of each battery over time can be defined using a degradation degree-versus-time correlation relationship. Alternatively, based on the idea that the battery degrades as the vehicle travels, the change in degree of degradation of each battery in accordance with the distance traveled can be defined using a degradation degree-versus-traveling distance correlation relationship. The degree of degradation can also be defined by finding the discharge characteristic using the present voltage or current of the battery and basing the degree of degradation on the change in the discharge characteristic. The decrease in internal resistance with respect to the degree of degradation is calculated and the change in the battery capacity is calculated. The second prescribed capacity is corrected based on this change in capacity. It is also acceptable for the second prescribed capacity to be divided into a plurality of prescribed capacities and it is preferred that the capacities targeted for correction include, for example, a capacity adjustment region. More specifically, there are no limits on the sections that divide the battery capacity into prescribed capacities so long as the battery capacity is divided at least into a first prescribed capacity and a second prescribed capacity. Thus, it is acceptable for the battery capacity to be divided into prescribed capacities that will be allocated to still other indicating device. In other words, regarding the first prescribed capacity, it is also possible to divide the first prescribed capacity into a plurality of capacity regions having prescribed capacities and to divide the second prescribed capacity into a plurality of capacity regions having prescribed capacities.

As a result, the effect that capacity changes accompanying degradation of the battery have on the capacity indication is suppressed and, while a constant possible traveling distance per segment is maintained, a fully charged state is indicated when a degraded battery has been fully charged. Thus, a capacity indicating device and capacity indicating method can be provided which prevent degradation of the battery over time from causing the user to experience a feeling that there is something wrong with the capacity indication.

In the illustrated embodiment, there are five capacity regions. More specifically, the five capacity regions of this illustrated embodiment are as follows: a capacity adjustment region a; a spare indication region b; a capacity indication region c; a residual capacity caution region d; and a residual capacity warning region e. The capacity adjustment region a is corrected, i.e., decreased, in response to the degree of degradation of the battery 7. The spare indication region b accommodates temperature changes. The capacity indication region c corresponds to the battery capacity that changes as power is consumed due to travel or the like. The residual capacity caution region d produces an indication or signal to the user that urges recharging when the residual battery capacity is low. The residual capacity warning region e indicates the vehicle cannot travel any further.

An example of the allocations to the battery capacity regions in this embodiment are explained with reference to FIG. 3. When the battery 7 is fully charged, the battery 7 has a total battery capacity value of 90 Ah, i.e., the sum of the five capacity regions. The individual capacity regions of the fully charged battery 7 of this illustrated embodiment have the prescribed values as follows:

Spare indication region b=7 Ah;
Capacity indication region c=70 Ah;
Capacity adjustment region a=8 Ah;
Residual capacity caution region d=3 Ah; and
Residual capacity warning region e=2 Ah.

When the battery 7 is fully charged, the traveling mileage is 9.6 km per segment (∴ 9.6 km×16 segments=153.6 km). Thus, the user can easily determine the available traveling range or mileage on the current battery charge by looking at the number of segments S that are activated.

As previously explained, this embodiment has the battery capacity divided into five battery capacity regions that includes the residual capacity warning region e, the residual capacity caution region d, the capacity adjustment region a, the capacity indication region c, and the spare indication region b as seen in FIG. 3. Among these, the spare indication region b and the capacity indication region c are both allocated to the first prescribed capacity for displaying the present battery capacity which are displayed by the first indicator 21 using the segments S to indicate the present battery capacity. The number of segments S corresponding to the present battery capacity illuminates for indicating the present battery capacity to the user. More specifically, the display formed by the plurality of segments S representing individual prescribed energy capacities equaling the first prescribed energy capacity of the first portion of the vehicle battery capacity. The individual prescribed energy capacities of the segments S are configured to indicate the present battery capacity in steps with equal values that are maintained after the degree of degradation of the vehicle battery and subsequent correction of the capacity adjustment region a as explained below.

Alternatively, only the capacity indication region c is allocated to the first prescribed capacity for displaying the present battery capacity. The capacity adjustment region a, the residual capacity caution region d and the residual capacity warning region e are allocated to the second prescribed capacity and indicated by the second indicator 22. It is also acceptable to allocate only the capacity adjustment region a, the residual capacity caution region d to the second prescribed capacity.

In short, this embodiment performs computations that allocate the capacity stored in the battery 7 to the spare indication region b, the capacity indication region c, the capacity adjustment region a, the residual capacity caution region d, and the residual capacity warning region e. In accordance with these allocations, all of the segments S (e.g., a total of sixteen) that constitute the first indicator 21 illuminate when the battery 7 is in a fully charged state. When the battery capacity decreases due to vehicle travel, the number of the segments S illuminated (e.g., ten) will correspond with the battery capacity that exists at that point in time and the residual segments S (e.g., six) will be unlit. When the vehicle travels further and the battery capacity becomes low, the Empty caution indicator lamp 22a of the second indicator 22 is illuminated and serves to urge the user to recharge the battery 7. If the battery capacity falls even lower, the Empty warning indicator lamp 22b is lit to indicate that the vehicle can no longer travel.

In other words, each of the aforementioned capacity regions a to e are computed for the purpose of illuminating and turning off the segment indicator (segments S), the Empty caution indicator lamp 22a, and the Empty warning indicator lamp 22b. Thus, the segments S and the Empty indicator lamps 22a and 22b that are illuminated or turned off are visually checked by the user to determine the state of the battery capacity.

In addition to this kind of illumination and turning off of indicators, the capacity indicating device 100 also executes computations for illuminating and turning off the indicators appropriately when the battery 7 has degraded. Details of these computations will be explained below.

In the embodiment shown in FIG. 3, the capacity corresponding to the capacity adjustment region a is corrected in response to the degradation of the battery 7. As shown in FIG. 3, the capacity adjustment region a during a new battery stage (1) is illustrated as a reference to a pair of degrading stages (2) and (3) in which the battery has been fully recharged, but degraded. In the degrading stage (2), the capacity adjustment region a decreases as the battery 7 degrades, and the capacity adjustment region a is thus smaller than that during the new battery stage (1). When the battery degradation progresses and the degraded stage (3) is reached, the capacity adjustment region a no longer exists. In this way, the capacity adjustment region a decreases in response to the degradation of the battery 7. Conversely, the capacity indication region c remains constant during the stages (1) and (2), as seen in FIG. 3, regardless of the battery degradation.

In the conventional capacity indicating device shown in comparative FIG. 4, during the new battery stage (1'), the full charged state includes a spare indication region b' for accommodating temperature changes and all of the segments S (16/16) of the capacity indication region c' are illuminated. As the battery degrades, the capacity indication region c' decreases and only some of the segments S (10/16) illuminate even when the battery is fully recharged. Thus, when the battery is degraded, a conventional capacity indicator does not clearly indicate whether or not the battery has been fully recharged and the user experience a feeling that something is wrong.

Returning to FIG. 3, the state during each of the stages (1) to (3) will be described. During the new battery stage (1) when the battery 7 is new and fully charged, the capacity adjustment region a is at its maximum value all of the segments S (16/16) of the capacity indication region c are illuminated. During the degrading stage (2) of FIG. 3, the battery capacity corresponding to the indication of the second indicator 22 and the threshold value for illuminating the Empty caution indicator lamp 22a both decrease because the capacity adjustment region a is reduced in response to the degree of degradation of the battery 7. Thus, since the effect of the decrease in capacity caused by battery degradation is corrected by subtracting the decrease from the capacity adjustment region a, which is a component of the second prescribed capacity, the value of the capacity indication region c is not affected by the battery degradation and the capacity of that region does not change. As a result, even if the battery degradation has progressed, the capacity indication after full recharging indicates the fully charged state (all sixteen segments S illuminated). Since, even when the battery 7 is degraded, the fully charged state is indicated by the capacity indicator after full recharging, the user does not experience a feeling that something is wrong as he or she would in the case of the indication illustrated in FIG. 4. The degrading stage (3) in FIG. 3 shows a state in which the battery 7 has degraded beyond the scheduled battery degradation degree. The capacity adjustment region a decreases as the battery 7 degrades and when the capacity adjustment region a reaches zero, the residual capacity is indicated as is without being further adjusted in response to the degradation. During the degrading stage (3) of FIG. 3, all sixteen of the segments S will not illuminate even if the battery 7 is full charged. Instead, only fourteen of the segments S will illuminate in accordance with the capacity that exists when the battery 7 has been fully recharged. Thus, when the degradation of the battery 7 exceeds that scheduled, the user can be informed of the battery degradation by using regular capacity indication.

Preferably, the capacity indicating device 100 sets a threshold value for reporting the recharging timing of the battery based on the second prescribed capacity. In particular, the second prescribed capacity is set as a threshold value for reporting the recharging timing of the vehicle battery by activating the Empty caution indicator lamp 22a. The second prescribed capacity is acceptable so long as it includes at least a prescribed capacity that is corrected in accordance with the degree of degradation of the battery. In addition, the second prescribed capacity can also include other prescribed capacities required for maintaining the travel of the vehicle, i.e., prescribed capacities necessary to enable the vehicle to travel properly. In other words, it is acceptable for the second prescribed capacity to be the sum of such capacities as a capacity required for continuance of the travel of the vehicle, a capacity for determining if recharging is necessary to maintain the travel of the vehicle, and a capacity (e.g., capacity adjustment region) established in order to be corrected in response to the degradation of the battery 7. Using a second prescribed capacity established in this way, the second indicator 22 reports the recharging timing of the vehicle battery 7. The capacity of the vehicle battery 7 decreases as the vehicle travels. When the battery capacity falls below the second prescribed capacity, the second indicator 22 illuminates or the like in order to inform the user that it is time to recharge the battery. In other words, the second prescribed capacity is corrected in response to the degree of degradation of the battery 7, and thus, changes in response to the correction. As the second prescribed capacity changes, the threshold value used to report the battery recharging also changes.

As a result, the effect of the change in battery capacity that accompanies degradation of the battery is absorbed by the change in the threshold value that is used to report the battery recharging timing and there is no effect on the capacity indication of the first indicator, which is used as information for the user to estimate the possible cruising distance. While a constant possible traveling distance per segment is maintained, a fully charged state is indicated when a degraded battery has been fully charged. Thus, a capacity indicating device and capacity indicating method can be provided which prevent degradation of the battery over time from causing the user to experience a feeling that there is something wrong with the capacity indication.

Capacity Indication Control

Next, the specific arrangement used for conducting the indications just described is explained. Referring again to FIG. 2, a schematic view of the capacity indicating device 100 is illustrated. The indication control unit or battery controller 1 preferably includes a microcomputer with an indication control program that controls the various components of the capacity indicating device 100 as discussed below. The indication control unit 1 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the indication control unit 1 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In this capacity indicating device 100, the voltage detecting device (voltage sensor) 6 detects the total voltage of the battery 7, which comprises a plurality of unit batteries (cells) connected in series. The current detecting device (current sensor) 5 detects the current flowing through the battery 7. The cell controller 8 manages the voltage, temperature, etc., of the cells that make up the battery 7. The indication control unit (battery controller) 1 computes the battery capacity and controls the battery 7 based on the voltage from voltage sensor 6, the current from the current sensor 5, and information related to the battery temperature. The capacity indicator (display) 2 receives the computation result from the indication control unit 1 (battery controller) and displays the battery capacity. The direct current electric power obtained from the battery 7 is converted into alternating current electric power by the inverter 4, and the alternating current electric power is transmitted to the motor 3 that is used to drive the vehicle.

As mentioned above, the capacity indicator 2 includes the first indicator 21 and the second indicator 22. The first indicator 21 indicates changes in the present battery capacity based mainly on the capacity indication region c. The capacity of the capacity indication region c is indicated using a plurality of (sixteen) segments S with each of the segments S having an energy capacity of a prescribed energy unit. The second indicator 22 includes the Empty caution indicator lamp 22a, and the Empty warning indicator lamp 22b to inform the user that the battery capacity is insufficient when the present battery capacity equals or falls below the second prescribed capacity. In this embodiment, the Empty caution indicator lamp 22a is illuminated as an Empty caution indication for urging the user to recharge the battery 7 when the battery capacity falls below the sum of the following capacities, which are allocated to the second prescribed capacity: the capacity corresponding to the capacity adjustment region a, the capacity corresponding to the residual capacity caution region d, and the capacity corresponding to the residual capacity warning region e.

When further energy is consumed and the battery capacity falls below the residual capacity warning region e, the Empty warning indicator lamp 22b is illuminated to inform the user that it will become difficult or impossible to travel. The Empty caution indicator lamp 22a and the Empty warning indicator lamp 22b can also be indicated integrally, or the two indications can be made in a step-like manner either separately or integrally.

The indication control unit 1 controls both the first indicator 21, which produces an indication based on the present battery capacity, and the second indicator 22, which displays the second prescribed capacity after the same has been corrected in response to the degree of degradation of the battery. The indication control unit 1 calculates the degree of degradation of the battery 7, corrects the second prescribed capacity or capacity adjustment region in accordance with the degree of degradation, and indicates the corrected second prescribed capacity or capacity adjustment region using the second indicator 22. It also indicates the present battery capacity in a step-like manner using the plurality of segments S of the first prescribed capacity.

Figure 5:
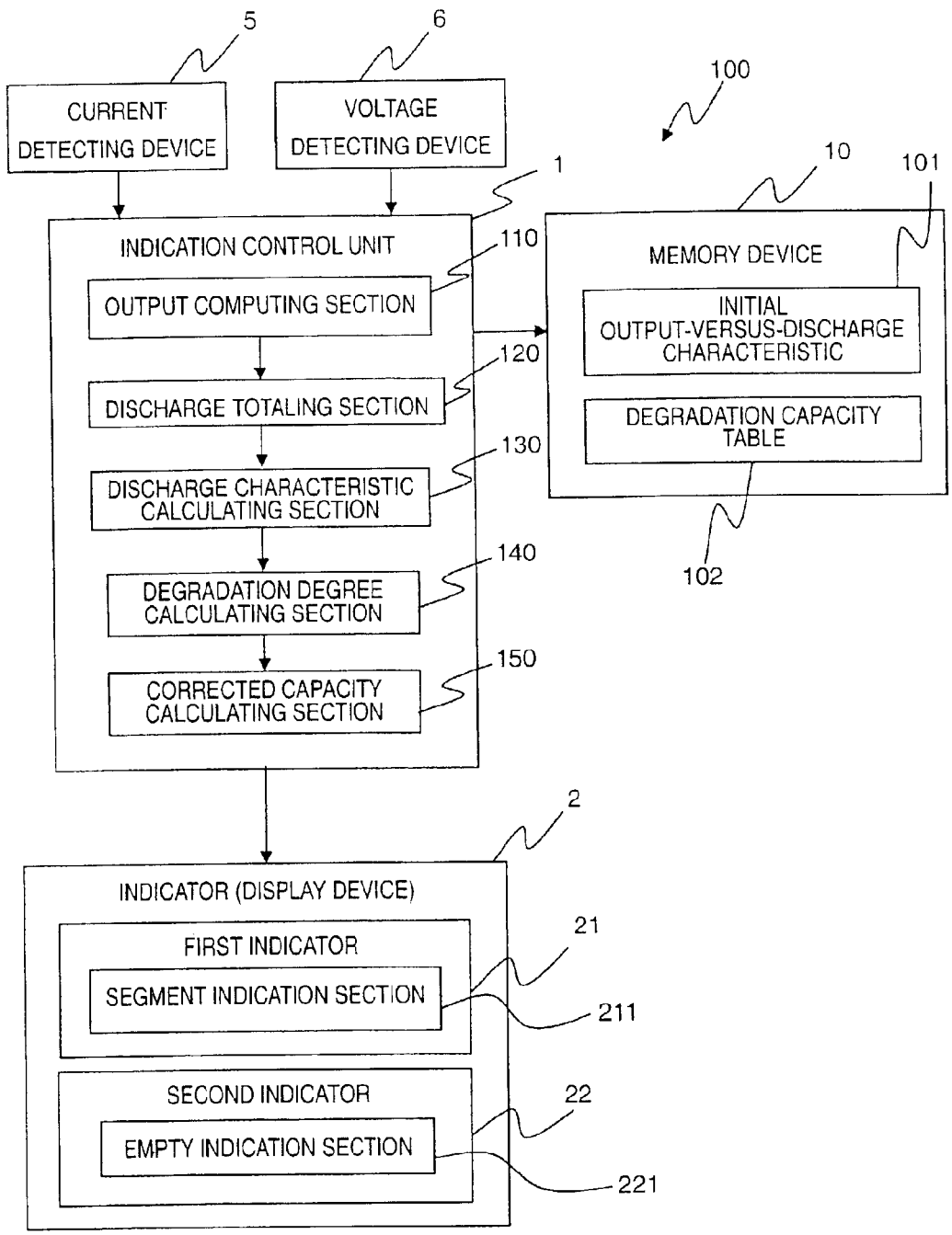
FIG. 5 is a block diagram showing the constituent features of the capacity indication control unit or controller according to one embodiment of the present invention.

FIG. 5 shows a block diagram of the embodiment centering on the indication control unit 1 shown in FIG. 2. As shown in FIG. 5, the current sensor 5 of the capacity indicating device 100 of this embodiment sends the detected current value to the indication control unit 1. The voltage detecting device 6 of the capacity indicating device 100 of this embodiment sends the detected voltage value to the indication control unit 1. The memory device 10 of the capacity indicating device 100 of this embodiment stores a variety of information, including an initial output-versus-discharge characteristic 101 that constitutes information indicating the output-versus-discharge characteristic of the battery 7 immediately after manufacture when the battery 7 was new and a degradation capacity table 102 that maps the degree of degradation versus the possible discharge capacity of the battery 7. The capacity indicator 2 of the capacity indicating device 100 of this embodiment is equipped with the first indicator 21 and the second indicator 22.

The first indicator 21 indicates in a step-like manner the residual battery capacity, i.e., the first prescribed capacity, which changes over time as power is consumed. This step-like indication of the residual battery capacity is accomplished with the plurality of segments S, and the indication performed by the segments S is controlled by a segment indication section 211. The segment indication section 211 also functions to reset the capacity per segment in response to the changes that occur in the capacity indication region c due to temperature fluctuations and the like. Meanwhile, the second indicator 22 performs the Empty caution indication and the Empty warning indication, which correspond to the second prescribed capacity.

Hereinafter, this embodiment will be explained under the assumption that the second indicator 22 performs the Empty caution indication that informs the user of the recharging timing. The Empty caution indicator lamp 22a illuminates when the present battery capacity has fallen below a prescribed value. This indication is controlled by an Empty indication section 221. In this embodiment, the second prescribed capacity serves as the threshold value for the Empty indication, i.e., illumination/activation of the Empty caution indicator lamp 22a. Although the second prescribed capacity is shown in FIG. 3 to include the capacity adjustment region a and the residual capacity caution region d, the second prescribed capacity is acceptable so long as it includes capacity adjustment region a.

The indication control unit 1 controls both the indication performed by the segments S of the first indicator 21 and the indication performed by the second indicator 22. In other words, the indication control unit 1 controls the indication of the segments S of the first indicator 21 based on the present capacity of the battery 7 and also controls the indications of the second indicator 22 by correcting the second prescribed capacity in response to the degree of degradation of the vehicle battery 7. In order to accomplish this control, the indication control unit 1 is provided with an output computing section 110, a discharge totaling section 120, a discharge characteristic calculating section 130, a degradation degree calculating section 140, and a corrected capacity calculating section 150.

Each of these components will now be described. The output computing section 110 calculates the battery capacity based on the voltage value of the battery 7 detected by the voltage detecting device 6 and the current of the battery 7 detected by the current detecting device 5. The discharge totaling section 120 calculates the cumulative energy discharged from the battery 7 based, again, on the voltage value of the battery 7 detected by the voltage detecting device 6 and the current of the battery 7 detected by the current detecting device 5. The discharge characteristic calculating section 130 calculates the output-versus-discharge characteristic of the battery 7 based on the battery capacity calculated by the output computing section 110 and the cumulative discharged energy calculated by the discharge totaling section 120. The degradation degree calculating section 140 calculates the present degradation degree of the battery 7 by comparing the output-versus-discharge characteristic calculated by the discharge characteristic calculating section 130 to the initial output-versus-discharge characteristic already stored in the memory device 10. The calculation of the degradation degree is described along with the operation of the capacity indicating device 100. The corrected capacity calculating section 150 corrects the capacity adjustment region a, which is included in the second prescribed capacity, in response to the degradation degree calculated by the degradation degree calculating section. The output computing section 110 has the voltage detecting device 6 detect the present voltage and, based on that voltage, calculates the present battery capacity using the output-versus-discharge characteristic.

The corrected capacity calculating section 150 reads the degradation capacity table stored in the memory device 10, calculates the possible discharge capacity of the battery 7 based on the previously calculated degradation degree by referring to the degradation capacity table, and corrects the second prescribed capacity in accordance with the calculated possible discharge capacity. It is also acceptable to calculate the second prescribed capacity by, for example, subtracting the first prescribed capacity (which was established as a fixed value) from the possible discharge capacity found in accordance with the degree of degradation. When the second prescribed capacity includes a capacity targeted for correction, e.g., a capacity adjustment region, and a capacity necessary for vehicle travel, it is acceptable to calculate the capacity intended to be corrected, e.g., the capacity adjustment region, by subtracting the capacity necessary for vehicle travel from the second prescribed capacity. The second indicator 22 produces its indications based on a second prescribed capacity that has been corrected in this manner.

Meanwhile, the output computing section 110 orders the voltage detecting device 5 to detect the present voltage value and, based on the detected present voltage value, calculates the present battery capacity using the previously obtained open voltage, internal resistance, and discharge characteristic. Thus calculated, the present battery capacity is indicated by the first indicator 21 as the residual capacity of the battery 7 or used capacity of the battery 7.

As a result, the effect that capacity changes accompanying degradation of the battery 7 have on the capacity indication is suppressed and, while a constant possible traveling distance per segment is maintained, a fully charged state is indicated when a degraded battery has been fully charged. Thus, the capacity indicating device 100 and its method can be provided which prevent degradation of the battery 7 over time from causing the user to experience a feeling that there is something wrong with the capacity indication.

Figure 6:
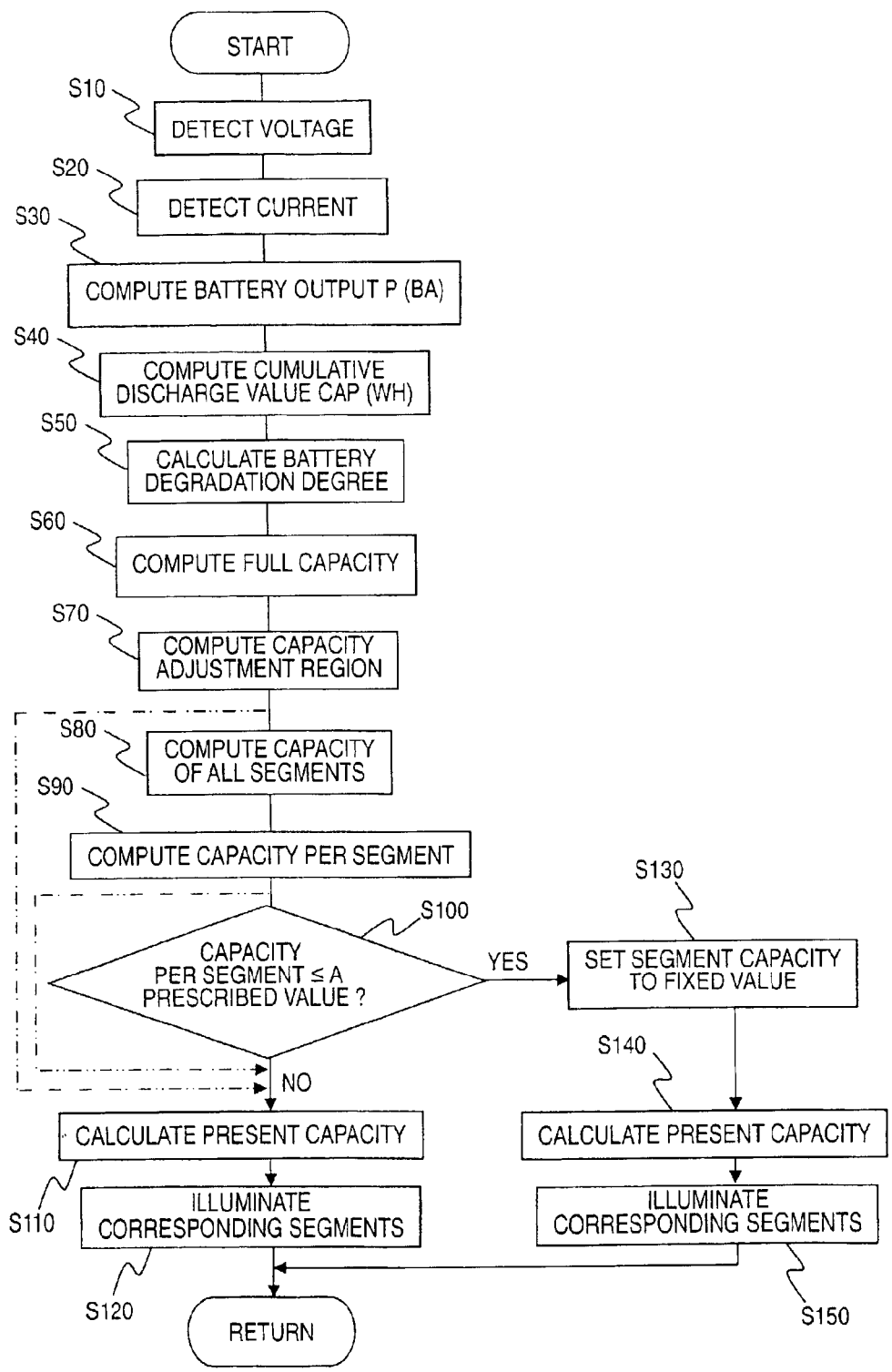
FIG. 6 is a flowchart for executing the operations by the capacity indication control unit or controller of the capacity indicating device of the present invention.
Figure 7:
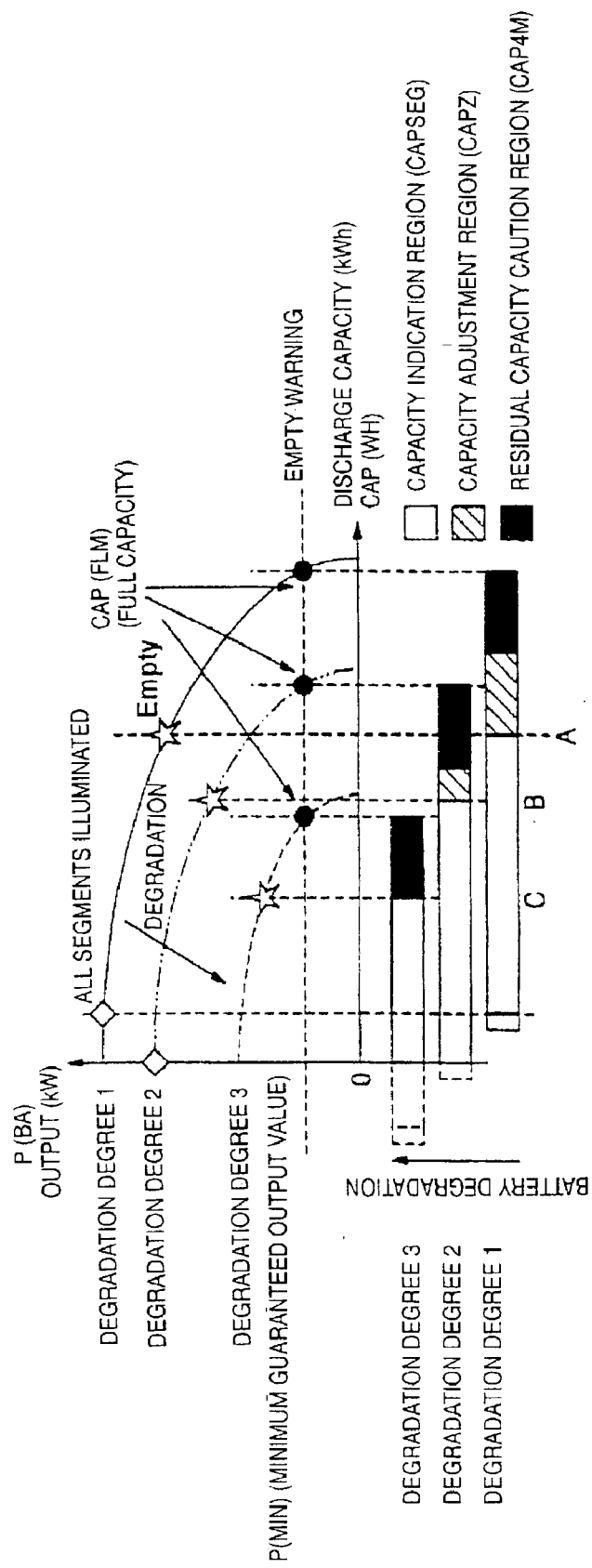
FIG. 7 is a graph for explaining the relationship between the discharge capacity and the output capacity for batteries having different degradation degrees.

Now, the operations that execute capacity indication in response to the degradation of the battery 7 are explained while referring to FIGS. 6 and 7. FIG. 6 is a flowchart regarding these operations, while FIG. 7 shows the relationship between the output (kW) of the battery 7 and the discharge capacity (kWh). The degree of degradation of the battery 7 can be found based on this relationship.

First, the voltage detecting device 6 detects the voltage of the battery 7 in step S10. The voltage of the battery 7 is detected not just once but a plurality of times, e.g., each time the vehicle travels a prescribed distance, or each time a prescribed amount of time elapses. Then, current detecting device 5 detects the recharging or discharging current of the battery 7 (step S20). This detection is also conducted a plurality of times, not just once, e.g., each time the vehicle travels a prescribed distance, or each time a prescribed amount of time elapses. The output computing section 110 executes regression computations based on the plurality of total voltage values detected by the voltage detecting device 6 and the plurality of current values detected by the current detecting device 5 and finds the unloaded voltage (open voltage) E0 and the slope R (internal resistance of battery). The output computing section then calculates the present battery output P(BA) using the following equation (1):

$$P(BA)=E1 \times (E0-E1)/R \tag{1}$$

wherein E1 is the most recent detected voltage (step S30).

Next, in step S40, the discharge totaling section 120 computes the cumulative discharged energy CAP (WH) based on the total voltage and current detected in steps S10 and S20.

The discharge characteristic calculating section 130 can calculate the output-versus-discharge characteristic with respect to the present battery output using the cumulative discharged energy CAP (WH) computed here and the battery output P(BA) calculated in step S30.

The degradation degree calculating section 140 calculates the present degradation degree of the battery by comparing the output-versus-discharge characteristic of the battery 7 calculated by the discharge characteristic calculating section 130 to the output-versus-discharge characteristic of the battery 7 when it was new (initial output-versus-discharge characteristic), which is stored in the initial output-versus-discharge characteristic 101 of the memory device 10 in advance (step S50).

Next, the degradation degree calculation executed by the degradation degree calculating section 140 will be explained while referring to FIG. 7. FIG. 7 shows the correlation between the battery output value P(BA) calculated based on the current value detected by the current detecting device 5 and the voltage value detected by the voltage detecting device 6 and the cumulative discharge energy CAP (WH) calculated based on the total voltage value and current value detected in steps S10 and S20. The graphs of degradation degree 1, degradation degree 2, and degradation degree 3 shown in FIG. 7 illustrate the output-versus-discharge characteristic correlation with respect to degradation degree. The degradation degree 1 is the lowest degradation degree, while the degradation degree 2 and the degradation degree 3 are successively higher (degradation is more progressed). As shown in FIG. 7, the output-versus-discharge characteristic correlation exhibits a distinctive relationship for each degradation degree. By comparing these to the initial output-versus-discharge characteristic, the degradation degree, i.e., the degree to which the battery 7 has degraded with respect to the initial (new) state of the battery 7, can be calculated. In short, the degradation degree of the battery 7 can be calculated by calculating the output-versus-discharge characteristic based on the output of the battery 7 and the result of the cumulative discharged energy calculation. In step 50, the degree of degradation of the battery 7 is calculated based on this approach. Among the prescribed output values shown in FIG. 7, P(MIN) is the minimum output value required by the vehicle. When the battery capacity cannot support this minimum required output value, the Empty warning indicator lamp 22a is activated. The amount of battery capacity that can be consumed before the battery 7 reaches the point where it can no longer deliver the minimum required output value is called the full capacity CAP (FLM) and indicated by a black dot for each degradation degree. The value of the full capacity CAP (FLM) differs depending on the degradation degree. The capacity indication region CAP (SEG), the capacity adjustment region CAP (Z), and the residual capacity caution region CAP (4M) are also shown in relation to the output-versus-discharge characteristic correlation. As shown, the capacity adjustment region CAP (Z) decreases as the degradation degree increases and the battery output at which Empty is indicated, which is affiliated with the residual capacity caution region CAP (4M), is indicated with a star. Thus, the discharge capacity at which the Empty indication occurs differs depending on the degradation degree.

Returning to FIG. 6, in step S60, the present full capacity CAP (FLM) of the battery (in accordance with the degradation degree) is found by referring to the degradation capacity table 102 already stored in the memory device 10 based on the degradation degree calculated in step S50. Here, the degradation capacity table 102 is information that maps the degradation degree to the corresponding capacity and is obtained either experimentally or theoretically for the particular battery and vehicle. The full capacity CAP (FLM) is the capacity at which only the minimum output required by the vehicle can be discharged. It is preferred that the battery temperature be detected and the value of the full capacity CAP (FLM) be corrected appropriately based on the detected battery temperature. The temperature compensating device used to accomplish this correction can be any of a variety of publicly known temperature compensating device.

Next, in step S70, the corrected capacity calculating section 150 calculates the capacity CAP (Z) corresponding to the capacity adjustment region using the following equation (2):

$$CAP(Z)=CAP(FLM)-CAP(SEG)-CAP(4M) \tag{2}$$

wherein CAP (FLM) is the full capacity at the present degradation degree (the capacity at which the minimum output-required by the vehicle can be discharged) and is corrected based on the detected battery temperature, CAP (SEG) is a preset capacity corresponding to the segments S and serves to indicate the first prescribed capacity, and CAP (4M) is a travel margin capacity that is preset for each particular vehicle and corresponds to the capacity required to secure vehicle travel. Thus, the capacity adjustment region CAP (Z) is found based on the degradation degree of the battery 7 when step S70 is executed and the capacity adjustment region CAP (Z) is corrected based on the degradation degree.

In step S80, the segment indication section 211 of the first indicator 21 acquires the value of CAP (Z) calculated in step S70 and calculates the present capacity CAP (R) corresponding to the actual segment indication using the following equation (3):

$$CAP(R)=CAP(FLM)-CAP(Z)-CAP(4M) \quad (3)$$

It is characteristic of this embodiment that the capacity of each segment basically does not change, but the actual capacity state of the battery 7 is affected by the temperature and traveling environment. Therefore, in order to achieve a more accurate capacity indication, the capacity indicating device 100 is made such that the segment capacity can be fine tuned in response to the temperature and traveling environment and the segment capacity SEG (R) is calculated based on the voltage and current detected at the present point in time. CAP (R) needs to be recalculated when the degradation of the battery 7 exceeds the original setting and the decrease in capacity accompanying the degradation becomes larger than the capacity adjustment region CAP (Z). The indicated capacity per segment is calculated (step S90) by dividing the segment capacity SEG (R) just calculated by the number of segments S (e.g., divide by 16 if there are 16 segments). This calculation can be executed continuously, whenever the vehicle starts moving, each time a prescribed distance is traveled, or each time a prescribed amount of time elapses.

Next, the segment indication section 211 determines if the value calculated for the capacity per segment is less than or equal to a prescribed or preset capacity value (step S100). If the capacity per segment is not less than or equal to the prescribed value, i.e., if the capacity per segment has not undergone a large change (decrease), then control proceeds to step S110. At step S110, the output computing section 110 calculates the present battery capacity by referring to the output-versus-discharge characteristic using the voltage detected by the voltage detecting device 6. Based on a control command generated in response to the calculated present battery capacity, the segment indication section 211 illuminates the corresponding segments S (step S120).

Thus, since the capacity adjustment region CAP (Z) is corrected in response to the battery degradation and the capacity indication region CAP (SEG) or CAP (R) is held at a prescribed value, all of the segments S illuminate when the battery 7 is fully charged and the user can confirm that the battery 7 is fully charged by checking the segment display even when the full capacity has changed due to degradation of the battery 7. Also, the user can accurately estimate the possible cruising distance based on the segment display because the cruising distance per segment is almost constant if the effects of the battery temperature and traveling conditions are eliminated.

The preset prescribed value used in step S100 is a threshold value for determining if the capacity adjusting processing of this embodiment should be executed. This value is set based on consideration of the battery degradation and whether or not the change in capacity per segment will cause the user to feel that something is wrong. In order to explain in more concrete terms, consider a case where the battery 7 can provide 10 km of travel per segment under a prescribed set of conditions (e.g., installed in a specific vehicle, battery temperature is 20° C.) when the battery 7 is new. As the battery 7 degrades, the capacity after full recharging will decline. If the capacity indicating device 100 is made such that all of the segments S illuminate when the battery 7 is fully charged, even when the battery 7 is degraded, then the capacity per segment will also decline as the battery 7 degrades. Assume the battery 7 has degraded to a point where battery 7 can provide 7 km of travel per segment. When the traveling distance changes greatly, e.g., from 10 km to 7 km, there is the possibility that the user will experience a feeling that something is wrong with the indicator. Therefore, the capacity adjusting processing used to cause all of the segments S to illuminate when the battery 7 is fully charged is not executed and the absolute capacity is indicated as is. This function is useful from the standpoint of alleviating the user's feeling that something is wrong in situations where the battery capacity has decreased below a capacity corresponding to the capacity adjustment region, which is predetermined in view of the degradation of the battery 7.

In step S100, if the capacity per segment is less than or equal to the prescribed value, then control proceeds to step S130 where the capacity per segment is set to a predetermined fixed value. Then, the present capacity is calculated based on the voltage obtained in step S140 and the corresponding segments S are illuminated based on the capacity per segment set in step S130. With this processing, all of the segments S are not illuminated even when the battery 7 is fully charged. This processing serves to keep the variation of the possible cruising distance per segment within a prescribed range so that the user can obtain an accurate estimate of the traveling distance per segment.

This embodiment includes processing for correcting the capacity adjustment region CAP (Z) and resetting the capacity per segment in response to the degradation of the battery 7, but it is not always necessary to execute this processing continuously because degradation of the battery 7 does not occur abruptly. Thus, it is also acceptable to execute the processing according to another timing factor, e.g., each time the battery 7 is recharged, each time the vehicle travels a prescribed distance, or each time a prescribed amount of time elapses. Also, although in this embodiment the capacity per segment is calculated in step S90 to accommodate changes in the battery capacity caused by temperature changes, it is also possible to eliminate this processing and use a preset segment capacity. Furthermore, although this embodiment indicates the absolute capacity without incorporating a correction based on the battery degradation when the capacity per segment is found to be less than or equal to a prescribed value in step S100, it is also acceptable to correct the indication in response to the battery degradation irrespective of the value of the capacity per segment. For example, after the capacity adjustment region is calculated in step S70, the capacity indicating device 100 could proceed to step S110, calculate the present capacity, and display the capacity using the segments S of a preset capacity. Alternatively, the capacity indicating device 100 could proceed from step S90 to step S110 and display the capacity using the segments S of a present capacity. This embodiment was described here in terms of the operations executed by the capacity indicating device 100, but the invention operates in the same manner and exhibits the same effects when considered as a capacity indicating method.

Figure 8:
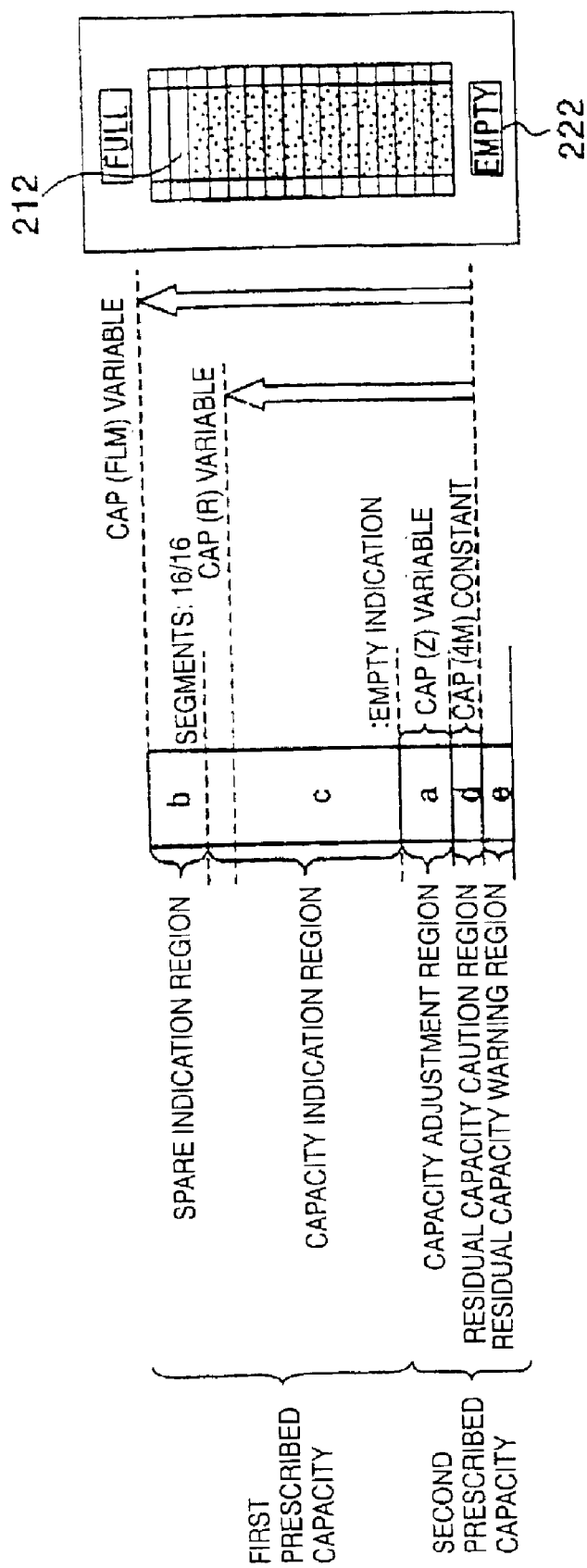
FIG. 8 is a diagram explaining the relationship between the calculated battery capacities and the indication on the capacity indicating device.

FIG. 8 shows the relation between the battery capacity allocations and a slightly modified version of the capacity indicator 2 of the capacity indicating device 100 that operates as just described. As in the capacity indicating device 100, discussed above, the spare indication region b and the capacity indication region c constitute the first prescribed capacity of the first indicator 212. Thus, the regions b and c are allocated to the segments S that forms part of the first indicator 212. The number of segments S corresponding to the present battery capacity illuminates for indicating the present battery capacity to the user. More specifically, the display formed by the plurality of segments S representing individual prescribed energy capacities equaling the first prescribed energy capacity of the first portion of the vehicle battery capacity. The individual prescribed energy capacities of the segments S are configured to indicate the present battery capacity in steps with equal values that are maintained after the degree of degradation of the vehicle battery and subsequent correction of the capacity adjustment region a.

Meanwhile, the capacity adjustment region a, the residual capacity caution region d and the residual capacity warning region e constitute the second prescribed capacity that are allocated to a single Empty indicator lamp that forms a part of the second indicator 222. The Empty indicator lamp of the second indicator 222 illuminates when the present battery capacity falls below a prescribed capacity. The maximum value of the capacity adjustment region a is a preset value based on the battery 7 and the vehicle in which the battery 7 is installed. It is also preferred that the residual capacity caution region d be preset based on the battery 7 and the vehicle in which the battery 7 is installed.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

This application claims priority to Japanese Patent Application No. 2001-356283. The entire disclosure of Japanese Patent Application No. 2001-356283 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. In other words, the embodiment described herein was presented to help the reader easily understand the present invention, not to limit the invention. The various elements and numeric values disclosed in the aforementioned embodiment description are not intended to represent all the design variations and equivalents included in the scope of the present invention. Thus, the scope of the invention is not limited to the disclosed embodiments.

What is claimed is:

1. A capacity indicating device for a vehicle battery, comprising:
   a first indicator including a display configured to selectively indicate a present battery capacity, which varies overtime as power is consumed, of a first prescribed energy capacity of a vehicle battery capacity at full battery capacity;
   a second indicator configured to indicate when the vehicle battery capacity is discharged below a second prescribed energy capacity of the vehicle battery capacity at the full battery capacity; and
   an indication control unit configured to allocate the vehicle battery capacity into a first portion and a second portion at the full battery capacity with the first portion being allocated to the first prescribed energy capacity and the second portion being allocated to the second prescribed energy capacity,
   the indication control unit being further configured to control activation of the first indicator to indicate the present battery capacity of the first prescribed energy capacity, control activation of the second indicator when the vehicle battery capacity is discharged below the second prescribed energy capacity, and correct allocation of the second portion allocated to the second prescribed capacity in response to a degree of degradation of the vehicle battery to maintain the first portion allocated to the first prescribed energy capacity after the degradation of the vehicle battery.

2. The capacity indicating device as recited in claim 1, wherein
   the display includes a plurality of segments representing prescribed energy capacities equaling the first prescribed energy capacity of the first portion of the vehicle battery capacity.

3. The capacity indicating device as recited in claim 2, wherein
   the prescribed energy capacities of the segments are configured to indicate the present battery capacity in steps with equal values that are maintained after the degree of degradation of the vehicle battery.

4. The capacity indicating device as recited in claim 1, wherein
   the second prescribed capacity includes at least a capacity adjustment region that is corrected in response to the degree of degradation of the vehicle battery.

5. The capacity indicating device as recited in claim 1, wherein
   the second prescribed capacity is set to a threshold value for activating a signal indicating time to recharge the vehicle battery.

6. The capacity indicating device as recited in claim 1, further comprising
   a detecting device configured to detect a voltage value of the battery and a current value of the battery, and
   a storage device configured to store at least an initial discharge characteristic of the battery and a deterioration capacity table that maps the degree of degradation of the battery to a corresponding dischargeable capacity of the battery,
   the indication control unit being configured to correct the second prescribed capacity in response to the degree of degradation of the vehicle battery based on the initial discharge characteristic of the battery and the deterioration capacity table.

7. A capacity indicating device for a vehicle battery, comprising:
   a first indicator including a display configured to selectively indicate a first prescribed energy capacity of a first portion of a vehicle battery capacity at full battery capacity and present battery capacity, which varies over time as power is consumed;
   a second indicator configured to indicate when the vehicle battery capacity is discharged below a second prescribed energy capacity representing a second portion of the vehicle battery capacity;

a detecting device configured to detect a voltage value of the battery and a current value of the battery;

a storage device configured to stare at least an initial discharge characteristic of the battery and a deterioration capacity table that maps the degree of degradation of the battery to a corresponding dischargeable capacity of the battery; and an indication control unit configured to control activation of the first indicator based on the present battery capacity, control activation of the second indicator arid correct the second prescribed capacity in response to the degree of degradation of the vehicle battery based on the initial discharge characteristic of the battery and the deterioration capacity table to maintain the first prescribed energy capacity after the degradation of the vehicle battery, the indication control unit including an output computing section configured to determine the battery output based on the voltage value, the current value detected by the detecting device, the present battery capacity and send a control command based on present battery capacity to the first indicator, a discharge totaling section configured to calculate the cumulative energy discharged from the battery based on the voltage value and the current value detected by the detecting device.

a discharge characteristic calculating section configured to calculate the discharge characteristic of the battery based on the battery output determined by the output computing section and the cumulative energy discharged from the battery as totaled by the discharge totaling section, a degradation degree calculating section configured to calculate the degree of degradation of the battery by comparing the initial discharge characteristic of the battery stored in the storage device and the discharge characteristic of the battery calculated by the discharge characteristic calculating section, and a corrected capacity calculating section configured to determine a present dischargeable capacity of the battery by referring to the degradation capacity table stored in the storage device using the degradation degree calculated by the degradation degree calculating device, correct the second prescribed capacity in accordance with the present dischargeable capacity, and send a corrected result to the second indicator.

8. A method of indicating capacity of a vehicle battery, comprising:

allocating a total vehicle battery capacity of the vehicle battery into at least a battery capacity indication section with a first prescribed energy capacity of a first portion of the vehicle battery capacity at full battery capacity and a capacity adjustment section with a second prescribed energy capacity of a second portion of the vehicle battery capacity at the full battery capacity, the first prescribed energy capacity being set to a constant capacity amount;

indicating a present battery capacity of the vehicle battery by a first indicator based on a present energy capacity allocated to the battery capacity indication section, which varies over time as power is consumed; and correcting the second prescribed energy capacity of the capacity adjustment section in response to changes in the vehicle battery capacity resulting from degradation of the vehicle battery such that changes in the vehicle battery capacity resulting from degradation of the vehicle battery maintains the first prescribed energy capacity to the constant capacity amount.

9. The method as recited in claim 8, wherein the indicating of the present battery capacity is displayed in by segments representing prescribed energy capacities equaling the first prescribed energy capacity of the first portion of the vehicle battery capacity.

10. The method as recited in claim 9, further comprising displaying the segments in steps with the prescribed energy capacities of the segments having equal values, and maintaining the prescribed energy capacities of the segments after the correcting of the second prescribed energy capacity of the capacity adjustment section due to the degree of degradation of the vehicle battery.

11. The method as recited in claim 8, further comprising activating a signal indicating time to recharge the vehicle battery when the vehicle battery capacity is discharged below the second prescribed energy capacity representing the second portion of the vehicle battery capacity.

12. A method of indicating capacity of a vehicle battery, comprising:

allocating a total vehicle battery capacity of the vehicle battery into a first prescribed energy capacity of a first portion of the vehicle battery capacity at full battery capacity and a second prescribed energy capacity of a second portion of the vehicle battery capacity at the full battery capacity;

indicating a present battery capacity of the vehicle battery by a first indicator based on a present energy capacity, which varies over time as power is consumed, based on the first prescribed energy capacity of the first portion of the vehicle battery capacity at full battery capacity;

producing an indication by a second indicator when the vehicle battery capacity is discharged below the second prescribed energy capacity representing the second portion of the vehicle battery capacity; and correcting the second prescribed capacity in response to the degree of degradation of the vehicle battery to a corrected second prescribed capacity such that the corrected second prescribed capacity is indicated by the second indicator and the first prescribed energy capacity is maintained after the degree of degradation of the vehicle battery.

13. The method as recited in claim 12, wherein the indicating of the present battery capacity is displayed in by segments representing prescribed energy capacities equaling the first prescribed energy capacity of the first portion of the vehicle battery capacity.

14. The method as recited in claim 13, further comprising displaying the segments in steps with the prescribed energy capacities of the segments having equal values, and maintaining the prescribed energy capacities of the segments after the correcting of the second prescribed energy capacity of the capacity adjustment section due to the degree of degradation of the vehicle battery.

15. The method as recited in claim 12, wherein the producing of the indication by the second indicator is set to a threshold value that corresponds to a time to recharge the vehicle battery.

16. A capacity indicating device for a vehicle battery, comprising:

a first indicating means for selectively indicating a present buttery capacity, which varies over time as power is consumed, of a first prescribed energy capacity of a vehicle battery capacity at fill battery capacity;

a second indicating means for indicating when the vehicle battery capacity is discharged below a second prescribed energy capacity of the vehicle battery capacity at the foil battery capacity; and an indication control unit means for allocating the vehicle battery capacity into a first portion and a second portion at the full battery capacity with the first portion being allocated to the first prescribed energy capacity and the second portion being allocated to the second prescribed energy capacity, controlling activation of the first indicating means to indicate the present battery capacity of the first prescribed energy capacity, controlling activation of the second indicating means when the vehicle battery capacity is discharged below the second prescribed energy capacity, and correcting allocation of the second portion allocated to the second prescribed capacity in response to a degree of degradation of the vehicle battery to maintain the first portion allocated to the first prescribed energy capacity after the degradation of the vehicle battery.

17. A vehicle comprising:

a vehicle battery with a vehicle battery capacity;

an electrically driven motor electrically coupled to the battery and operatively coupled to drive at least one vehicle wheel;

a capacity indicating device operatively coupled to the vehicle battery, the indicating device including a first indicator including a display configured to selectively indicate a present battery capacity, which varies over time as power is consumed, of a first prescribed energy capacity of a vehicle battery capacity at full battery capacity;

a second indicator configured to indicate when the vehicle battery capacity is discharged below a second prescribed energy capacity of the vehicle battery capacity at the full battery capacity; and an indication control unit configured to allocate the vehicle battery capacity into a first portion and a second portion at the full battery capacity with the first portion being allocated to the first prescribed energy capacity end the second portion being allocated to the second prescribed energy capacity, the indication control unit being further configured to control activation of the first indicator to indicate the present battery capacity of the first prescribed energy capacity, control activation of the second indicator when the vehicle battery capacity is discharged below the second prescribed energy capacity, and correct allocation of the second portion allocated to the second prescribed capacity in response to a degree of degradation of the vehicle battery to maintain the first portion allocated to the first prescribed energy capacity after the degradation of the vehicle battery.

18. The vehicle as recited in claim 17, further comprising an engine operatively coupled to drive at least one vehicle wheel.

19. The capacity indicating device as recited in claim 17, wherein the display includes a plurality of segments representing prescribed energy capacities equaling the first prescribed energy capacity of the first portion of the vehicle battery capacity.

20. The capacity indicating device as recited in claim 19, wherein prescribed energy capacities of the segments are configured to indicate the present battery capacity in steps with equal values that are maintained after the degree of degradation of the vehicle battery.

* * * * *